US012230178B2

(12) United States Patent
Yamamoto

(10) Patent No.: US 12,230,178 B2
(45) Date of Patent: Feb. 18, 2025

(54) DISPLAY DEVICE

(71) Applicant: Sharp Display Technology Corporation, Kameyama (JP)

(72) Inventor: Keiichi Yamamoto, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/577,805

(22) PCT Filed: Aug. 24, 2021

(86) PCT No.: PCT/JP2021/031022

§ 371 (c)(1),
(2) Date: Jan. 9, 2024

(87) PCT Pub. No.: WO2023/026369

PCT Pub. Date: Mar. 2, 2023

(65) Prior Publication Data

US 2024/0331596 A1 Oct. 3, 2024

(51) Int. Cl.
*G09G 3/00* (2006.01)
*G09G 3/3233* (2016.01)

(52) U.S. Cl.
CPC .......... *G09G 3/006* (2013.01); *G09G 3/3233* (2013.01); *G09G 2300/0819* (2013.01); *G09G 2300/0842* (2013.01); *G09G 2320/041* (2013.01); *G09G 2330/12* (2013.01)

(58) Field of Classification Search
CPC ................ G09G 3/006; G09G 3/3233; G09G 2300/0819; G09G 2300/0842; G09G 2320/041; G09G 2330/12
See application file for complete search history.

(56) References Cited

U.S. PATENT DOCUMENTS 10,175,819 B2 * 1/2019 Kwon .................... G09G 5/003
10,902,774 B2 * 1/2021 Hwang ............... H01L 27/1255
2005/0243076 A1 * 11/2005 Kim ..................... G09G 3/3233 345/204

(Continued)

FOREIGN PATENT DOCUMENTS

JP 2009-300285 A 12/2009
JP 2010-224262 A 10/2010
JP 2012-252216 A 12/2012

OTHER PUBLICATIONS

Nakamura et al., Translation of JP_2009300285, Dec. 24, 2009 (Year: 2009).*

*Primary Examiner* — Dmitriy Bolotin

(74) *Attorney, Agent, or Firm* — ScienBiziP, P.C.

(57) ABSTRACT

A display device includes: at least one first pixel including a first drive transistor and a first initialization transistor configured to initialize the first drive transistor; at least one second pixel including a second drive transistor and a second initialization transistor configured to initialize the second drive transistor; a first initialization line connected to the first drive transistor via the first initialization transistor; a second initialization line connected to the second drive transistor via the second initialization transistor; and a first temperature detection transistor connected to the second initialization line, the first temperature detection transistor including a gate connected to the first initialization line.

10 Claims, 9 Drawing Sheets

(56) References Cited

U.S. PATENT DOCUMENTS

| | | | | |
|---|---|---|---|---|
| 2005/0269959 | A1* | 12/2005 | Uchino | G02B 6/4268 315/169.3 |
| 2008/0062096 | A1* | 3/2008 | Yamashita | H10K 59/131 345/82 |
| 2011/0242072 | A1* | 10/2011 | Ota | G09G 3/3233 345/204 |
| 2012/0306826 | A1 | 12/2012 | Tsuchi | |
| 2014/0139412 | A1* | 5/2014 | Han | G09G 3/34 345/82 |
| 2014/0306945 | A1* | 10/2014 | Kishi | G09G 3/30 345/76 |
| 2015/0364085 | A1* | 12/2015 | Kanda | G09G 3/3233 345/76 |
| 2016/0027355 | A1 | 1/2016 | Tsuchi | |
| 2019/0156716 | A1 | 5/2019 | Kim et al. | |
| 2020/0402458 | A1* | 12/2020 | Gao | G09G 3/3233 |
| 2022/0317818 | A1* | 10/2022 | Furukawa | G06F 3/0412 |
| 2023/0225160 | A1* | 7/2023 | Cho | G09G 3/3233 345/694 |
| 2024/0144885 | A1* | 5/2024 | Han | H10K 59/131 |
| 2024/0274078 | A1* | 8/2024 | Choi | H10K 59/1213 |

* cited by examiner

DISPLAY DEVICE

TECHNICAL FIELD

The disclosure relates to a display device.

BACKGROUND ART

In an organic light-emitting diode (OLED) display device, it is known to detect a temperature of a pixel in order to compensate for a characteristic shift of a drive transistor provided in a pixel circuit on a pixel-by-pixel basis.

PTL 1 discloses a light-emitting device provided with a pixel including a pixel circuit and a temperature detection circuit.

CITATION LIST

Patent Literature

PTL 1: JP 2010-224262 A

SUMMARY

Technical Problem

A light-emitting device disclosed in PTL 1 includes a reading line connected to an output end of a temperature detection circuit. This reading line is an unnecessary bus line in a light-emitting device that does not detect a temperature of a pixel.

In the light-emitting device disclosed in PTL 1, the degree of freedom in design is limited because an unnecessary bus line is provided in a light-emitting device that does not detect a temperature of a pixel.

Solution to Problem

A display device according to an aspect of the disclosure includes at least one first pixel including a first drive transistor and a first initialization transistor configured to initialize the first drive transistor, at least one second pixel including a second drive transistor and a second initialization transistor configured to initialize the second drive transistor, a first initialization line connected to the first drive transistor via the first initialization transistor, a second initialization line connected to the second drive transistor via the second initialization transistor, and a first temperature detection transistor connected to the second initialization line, the first temperature detection transistor including a gate connected to the first initialization line.

Advantageous Effects of Disclosure

According to an aspect of the disclosure, a display device having a degree of freedom in design can be achieved.

DESCRIPTION OF EMBODIMENTS

Figure 1:
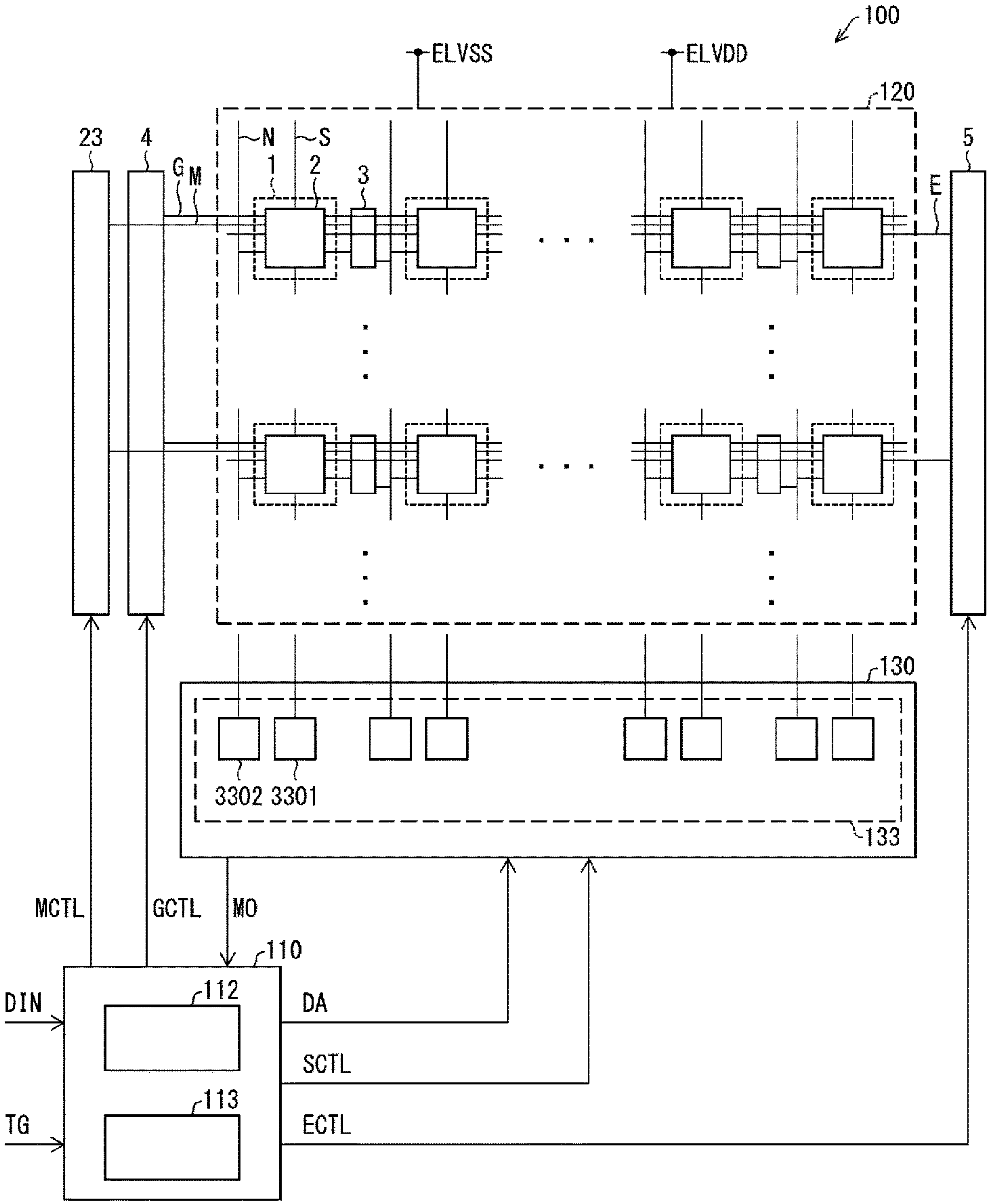
FIG. 1 is a schematic view of a display device according to embodiments of the disclosure.

Embodiments of the disclosure will be described below. Note that, for convenience of description, members having the same functions as the members described earlier may be denoted by the same reference numerals and signs, and the description thereof will not be repeated.

FIG. 1 is a schematic diagram of a display device 100 according to the embodiments of the disclosure. The display device 100 is a specific example of an active matrix type OLED display device. The display device 100 includes a display control circuit 110, a display portion 120, a source driver 130, a gate driver 4, a monitor driver 23, and an emission driver 5.

Typically, the gate driver 4, the monitor driver 23, and the emission driver 5 are formed to be monolithic, but may be configured so as not to be monolithic.

The display device 100 is further provided with power supply lines ELVDD and ELVSS common to a large number of pixels 2. Regarding driving of each light-emitting element, which will be described later, the potential of the power supply line ELVDD is at a high level, and the potential of the power supply line ELVSS is at a low level.

The display control circuit 110 includes a compensation processing unit 112 and a temperature detection unit 113. The compensation processing unit 112 compensates for deterioration of a drive transistor and a light-emitting element, which will be described later. The temperature detection unit 113 detects the temperatures of the pixels 2.

The display portion 120 includes a large number of data lines S and a large number of gate lines G orthogonal to the large number of data lines S. A large number of monitor lines M are provided in the display portion 120 in one-to-one correspondence with the large number of gate lines G. In the display portion 120, a plurality of emission lines E are provided in one-to-one correspondence with the large number of gate lines G. The gate lines G, the monitor lines M, and the emission lines E are typically parallel to each other in the display portion 120.

In the display portion 120, the pixel 2 is formed at each of intersections of the data lines S and the gate lines G. The large number of pixels 2 are disposed in a matrix shape. One pixel 2 corresponds to one pixel in the display device 100 and emits, for example, light of any one of red, green, and blue. Further, a unit including one pixel 2 or a plurality of pixels 2 adjacent to each other along a certain row is referred to as a pixel unit 1. For example, one pixel unit 1 may emit light of any one of red, green, and blue, or may emit light of a color obtained by combining two or more of these colors.

The display control circuit 110 receives an input image signal DIN and a group of timing signals (for example, a horizontal synchronization signal, and a vertical synchronization signal) TG sent from the outside of the display control circuit 110. The display control circuit 110 outputs a data signal DA, a source control signal SCTL, a gate control signal GCTL, a monitor driver control signal MCTL, and an emission driver control signal ECTL. The source control signal SCTL is a signal for controlling an operation of the source driver 130. The gate control signal GCTL is a signal for controlling an operation of the gate driver 4. The monitor driver control signal MCTL is a signal for controlling an operation of the monitor driver 23. The emission driver control signal ECTL is a signal for controlling an operation of the emission driver 5. The data signal DA is a signal for image display, and is generated by the compensation processing unit 112 and the temperature detection unit 113 performing compensation calculation processing on the input image signal DIN in response to monitor data MO supplied from the source driver 130. The monitor data MO includes data necessary for obtaining characteristics of the drive transistor, characteristics of the light-emitting element, and a temperature of the pixel 2.

The gate driver 4 is connected to the large number of gate lines G and supplies a scanning signal to each gate line G based on the gate control signal GCTL. The monitor driver 23 is connected to the large number of monitor lines M and supplies a monitor control signal to each monitor line M based on the monitor driver control signal MCTL. The emission driver 5 is connected to the large number of emission lines E and supplies an emission control signal to each emission line E based on the emission driver control signal ECTL.

The source driver 130 includes an output unit 133. The output unit 133 includes a large number of output circuits 3301 connected to the large number of data lines S in one-to-one correspondence with the large number of data lines S. The output circuit 3301 supplies a luminance signal to the data line S connected thereto based on the data signal DA. The output circuit 3301 operates based on the source control signal SCTL and measures a current flowing through the data line S connected thereto.

A large number of initialization lines N are provided in the display portion 120. The pixel unit 1 is formed at each of intersections of the initialization lines N and the gate lines G. The data lines S and the initialization lines N are typically parallel to each other in the display portion 120.

The output unit 133 includes a large number of output circuits 3302 connected to the large number of initialization lines N in one-to-one correspondence with the large number of initialization lines N. The output circuit 3302 operates based on the source control signal SCTL, and has a function as an initialization line driver that controls a potential of the initialization line N connected to the output circuit 3302 itself. The output circuit 3302 operates based on the source control signal SCTL, and has a function as a monitor circuit that measures a current flowing through the initialization line N connected to the output circuit 3302 itself.

The display portion 120 includes a temperature detection circuit 3. One temperature detection circuit 3 is provided for two corresponding pixel units 1 among the large number of pixel units 1. The temperature detection circuit 3 is required to detect a temperature of one of the pixels 2 included in the two pixel units 1.

In the display device 100, the output circuit 3301 is provided for each of the large number of data lines S, but may be provided in common to two or more data lines S. In the display device 100, the output circuit 3302 is provided for each of the large number of initialization lines N, but may be provided in common to two or more initialization lines N.

First Embodiment

Figure 2:
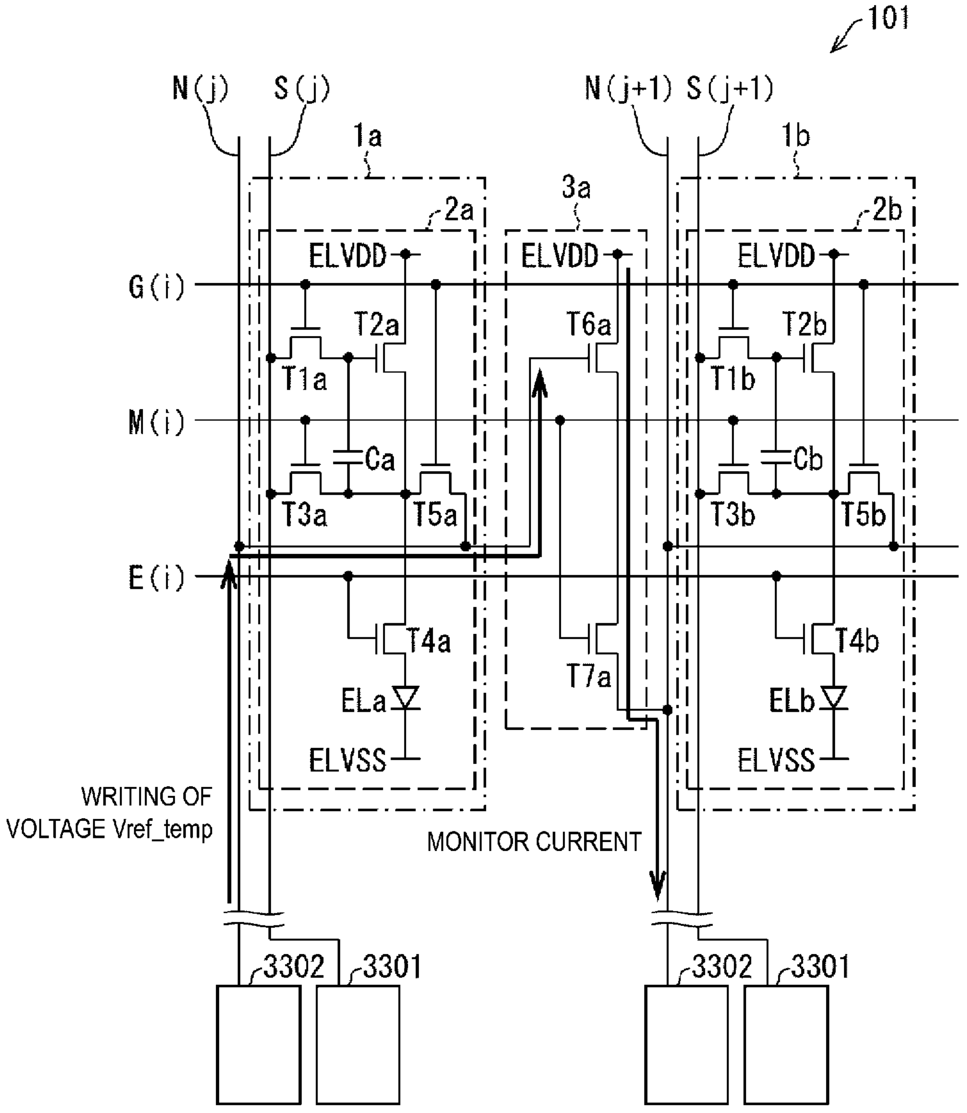
FIG. 2 is a circuit diagram illustrating a schematic configuration of a main portion of a display device according to a first embodiment of the disclosure.

FIG. 2 is a circuit diagram illustrating a schematic configuration of a main portion 101 of the display device 100 according to a first embodiment of the disclosure. The main portion 101 is illustrated with a first pixel unit 1*a*, a second pixel unit 1*b*, a first temperature detection circuit 3*a*, and the periphery thereof. Each of the first pixel unit 1*a* and the second pixel unit 1*b* is one of the large number of pixel units 1. The first temperature detection circuit 3*a* is one temperature detection circuit 3.

The first pixel unit 1*a* includes at least one (here, one) first pixel 2*a*. It is assumed that the first pixel unit 1*a* is disposed at an i-th row and a j-th column in the large number of pixel units 1 disposed in a matrix. The first pixel 2*a* includes a first write transistor T1*a*, a first drive transistor T2*a*, a first monitor transistor T3*a*, a first emission transistor T4*a*, a first initialization transistor T5*a*, a first capacitor Ca, and a first light-emitting element ELa. Each of the transistors included in the first pixel 2*a* is, for example, an n-channel type MOSFET.

A gate of the first write transistor T1*a* and a gate of the first initialization transistor T5*a* are connected to the gate line G(i) in the i-th row corresponding to the first pixel unit 1*a*. The first write transistor T1*a* is connected between the data line S(j) in the j-th column corresponding to the first pixel unit 1*a* and a gate of the first drive transistor T2*a*. The first initialization transistor T5*a* is connected between the first drive transistor T2*a* and the first initialization line N(j) corresponding to the first pixel unit 1*a*. The first initialization line N(j) is also the initialization line N in the j-th column. When the first initialization transistor T5*a* is turned on, the first initialization transistor T5*a* connects a source of the first drive transistor T2*a* to the first initialization line N(j), so that a source potential of the first drive transistor T2*a* is made to be a potential of the first initialization line N(j) (the first drive transistor is initialized).

A gate of the first drive transistor T2*a* is connected to the data line S(j) via the first write transistor T1*a*. The first drive transistor T2*a* is connected between the power supply line ELVDD and the first emission transistor T4*a*.

A gate of the first monitor transistor T3*a* is connected to the monitor line M(i) in the i-th row corresponding to the first pixel unit 1*a*. The first monitor transistor T3*a* is connected between the data line S(j) and the first drive transistor T2*a*.

A gate of the first emission transistor T4*a* is connected to the emission line E(i) in the i-th row corresponding to the first pixel unit 1*a*. The first emission transistor T4*a* is connected between the first drive transistor T2*a* and an anode of the first light-emitting element ELa.

The anode of the first light-emitting element ELa is connected to the first emission transistor T4*a*. A cathode of the first light-emitting element ELa is connected to the power supply line ELVSS. One end of the first capacitor Ca is connected between the first write transistor T1*a* and the gate of the first drive transistor T2*a*. The other end of the first capacitor Ca is connected between the first drive transistor T2*a* and the first monitor transistor T3*a*.

The second pixel unit 1*b* includes at least one (here, one) second pixel 2*b*. It is assumed that the second pixel unit 1*b* is the pixel unit 1 disposed at the i-th row and a (j+1)-th column among the large number of pixel units 1 disposed in the matrix. The second pixel 2_b_ includes a second write transistor T1_b_, a second drive transistor T2_b_, a second monitor transistor T3_b_, a second emission transistor T4_b_, a second initialization transistor T5_b_, a second capacitor Cb, and a second light-emitting element ELb. Each of the transistors included in the second pixel 2_b_ is, for example, an n-channel type MOSFET.

A gate of the second write transistor T1_b_ and a gate of the second initialization transistor T5_b_ are connected to the gate line G(i) corresponding to the second pixel unit 1_b_. The second write transistor T1_b_ is connected between the data line S(j+1) in the (j+1)-th column corresponding to the second pixel unit 1_b_ and a gate of the second drive transistor T2_b_. The second initialization transistor T5_b_ is connected between the second drive transistor T2_b_ and the second initialization line N(j+1) corresponding to the second pixel unit 1_b_. The second initialization line N(j+1) may be the initialization line N in the (j+1)-th column. When the second initialization transistor T5_b_ itself is turned on, the second initialization transistor T5_b_ connects a source of the second drive transistor T2_b_ to the second initialization line N(j+1), so that a source potential of the second drive transistor T2_b_ is made to be a potential of the second initialization line N(j+1) (the second drive transistor is initialized).

The gate of the second drive transistor T2_b_ is connected to the data line S(+1) via the second write transistor T1_b_. The second drive transistor T2_b_ is connected between the power supply line ELVDD and the second emission transistor T4_b_.

A gate of the second monitor transistor T3_b_ is connected to the monitor line M(i) corresponding to the second pixel unit 1_b_. The second monitor transistor T3_b_ is connected between the data line S(j+1) and the second drive transistor T2_b_.

A gate of the second emission transistor T4_b_ is connected to the emission line E(i) corresponding to the second pixel unit 1_b_. The second emission transistor T4_b_ is connected between the second drive transistor T2_b_ and an anode of the second light-emitting element ELb.

The anode of the second light-emitting element ELb is connected to the second emission transistor T4_b_. A cathode of the second light-emitting element ELb is connected to the power supply line ELVSS. One end of the second capacitor Cb is connected between the second write transistor T1_b_ and the gate of the second drive transistor T2_b_. The other end of the second capacitor Cb is connected between the second drive transistor T2_b_ and the second monitor transistor T3_b_.

The first temperature detection circuit 3_a_ includes a first temperature detection transistor T6_a_ and a first switch transistor T7_a_. A gate of the first temperature detection transistor T6_a_ is connected to the first initialization line N(j). The first temperature detection transistor T6_a_ is connected between the power supply line ELVDD and the second initialization line N(j+1). A gate of the first switch transistor T7_a_ is connected to the monitor line M(i) corresponding to the first pixel unit 1_a_. The first switch transistor T7_a_ is connected between the first temperature detection transistor T6_a_ and the second initialization line N(j+1). In other words, the first temperature detection transistor T6_a_ is connected to the second initialization line N(j+1) via the first switch transistor T7_a_.

The main portion 101 includes the output circuit 3301 and the output circuit 3302. The output circuit 3301 is connected to each of the data lines S(j) and S(j+1), and the output circuit 3302 is connected to each of the first initialization line N(j) and the second initialization line N(j+1).

Figure 3:
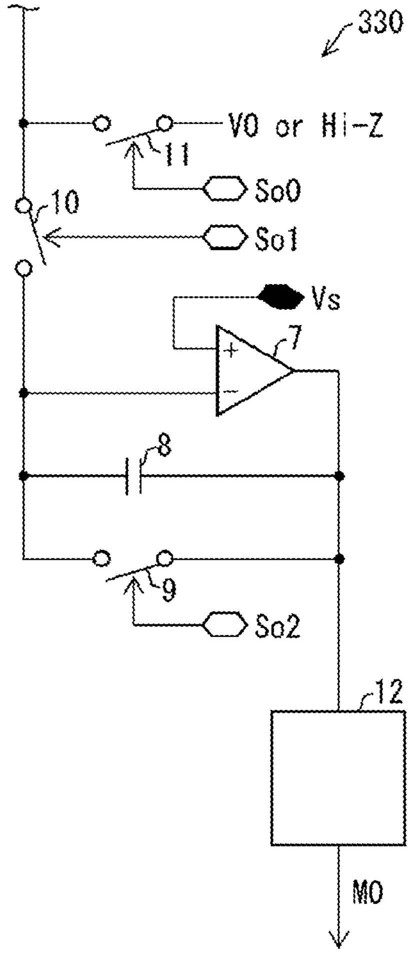
FIG. 3 is a circuit diagram illustrating an example of an output circuit.

FIG. 3 is a circuit diagram illustrating an example of an output circuit 330. The output circuit 330 can be used as any one of the output circuit 3301 and the output circuit 3302. The output circuit 330 includes an operational amplifier 7, a capacitor 8, switches 9 to 11, and a signal converter 12. An inverting input terminal of the operational amplifier 7 is connected to a connection target wiring line (any one of the first initialization line N(j), the second initialization line N(j+1), and the data lines S(j) and S(j+1)) to which the output circuit 330 is connected. An analog voltage Vs is applied to a non-inverting input terminal of the operational amplifier 7. The capacitor 8 and the switch 9 are connected between an output terminal of the operational amplifier 7 and the connection target wiring line. The switches 9 to 11 are switched on and off by a control clock signal So2, a signal So1, and a signal So0, respectively. The output circuit 330 is constituted by an integration circuit.

In the output circuit 330, when the switch 9 is turned on by the control clock signal So2, the output terminal and the inverting input terminal of the operational amplifier 7 are short-circuited. As a result, a potential of the output terminal of the operational amplifier 7 and a potential of the connection target wiring line become equal to a potential of the analog voltage Vs. By changing the potential of the analog voltage Vs when the switch 9 is in an on state, the output circuit 330 can function as an initialization line driver that controls the potential of the connection target wiring line in response to the potential of the analog voltage Vs. In the main portion 101, the output circuits 3302 connected to the first initialization line N(j) and the second initialization line N(j+1) function as initialization line drivers that control a potential of the first initialization line N(j) and a potential of the second initialization line N(j+1), respectively.

In the output circuit 330, when the switch 9 is turned off by the control clock signal So2, the potential of the output terminal of the operational amplifier 7 changes according to the magnitude of a current flowing through the connection target wiring line due to the presence of the capacitor 8. An output signal from the operational amplifier 7 serves as output data to the signal converter 12. The signal converter 12 performs AD conversion on an output signal from the operational amplifier 7 and outputs the converted signal as monitor data MO. In this manner, the output circuit 330 can function as a monitor circuit that performs an output that changes according to the magnitude of a current flowing through the connection target wiring line. In the main portion 101, the output circuit 3302 connected to the second initialization line N(j+1) functions as a monitor circuit that performs an output that changes according to the magnitude of a current flowing through the second initialization line N(j+1). In the main portion 101, the output circuits 3301 connected to the data lines S(j) and S(j+1) also function as monitor circuits that perform outputs that change according to the magnitudes of currents flowing through the data lines S(j) and S(j+1), respectively.

The switch 10 is connected between the connection target wiring line and the inverting input terminal of the operational amplifier 7. The switch 10 is provided in order to prevent a current from flowing from the connection target wiring line to the output circuit 330 when the output data of the output circuit 330 is determined. One end of the switch 11 is connected between the connection target wiring line and the switch 10, and the other end thereof is connected to a voltage source (not illustrated). When a bus line of a panel is disconnected from the source driver side during the AD conversion of the output data from the output circuit 330, the switch 11 switches which of a voltage for black display (V0)

or floating (Hi-Z) is to be fixed with the bus line. Since noise is likely to occur in the bus line in the floating state, the bus line can be fixed to the voltage for black display if, by any chance, the noise affects display. It is not essential that the switch 11 is provided in the output circuit 330.

The output data of the output circuit 330 is the monitor data MO and is sent to the display control circuit 110.

When the connection target wiring line is the second initialization line N(j+1), the temperature detection unit 113 detects characteristics of the first temperature detection transistor T6*a* associated with a current value of the output data. Then, the temperature detection unit 113 detects, as a temperature of the first pixel 2*a*, a temperature at which the first temperature detection transistor T6*a* exhibits the characteristics detected by the temperature detection unit 113.

When the connection target wiring line is the data line S(j), the compensation processing unit 112 can detect characteristics of the first drive transistor T2*a* from a current value of the output data. When the connection target wiring line is the data line S(j+1), the compensation processing unit 112 can detect characteristics of the second drive transistor T2*b* from a current value of the output data.

Figure 4:
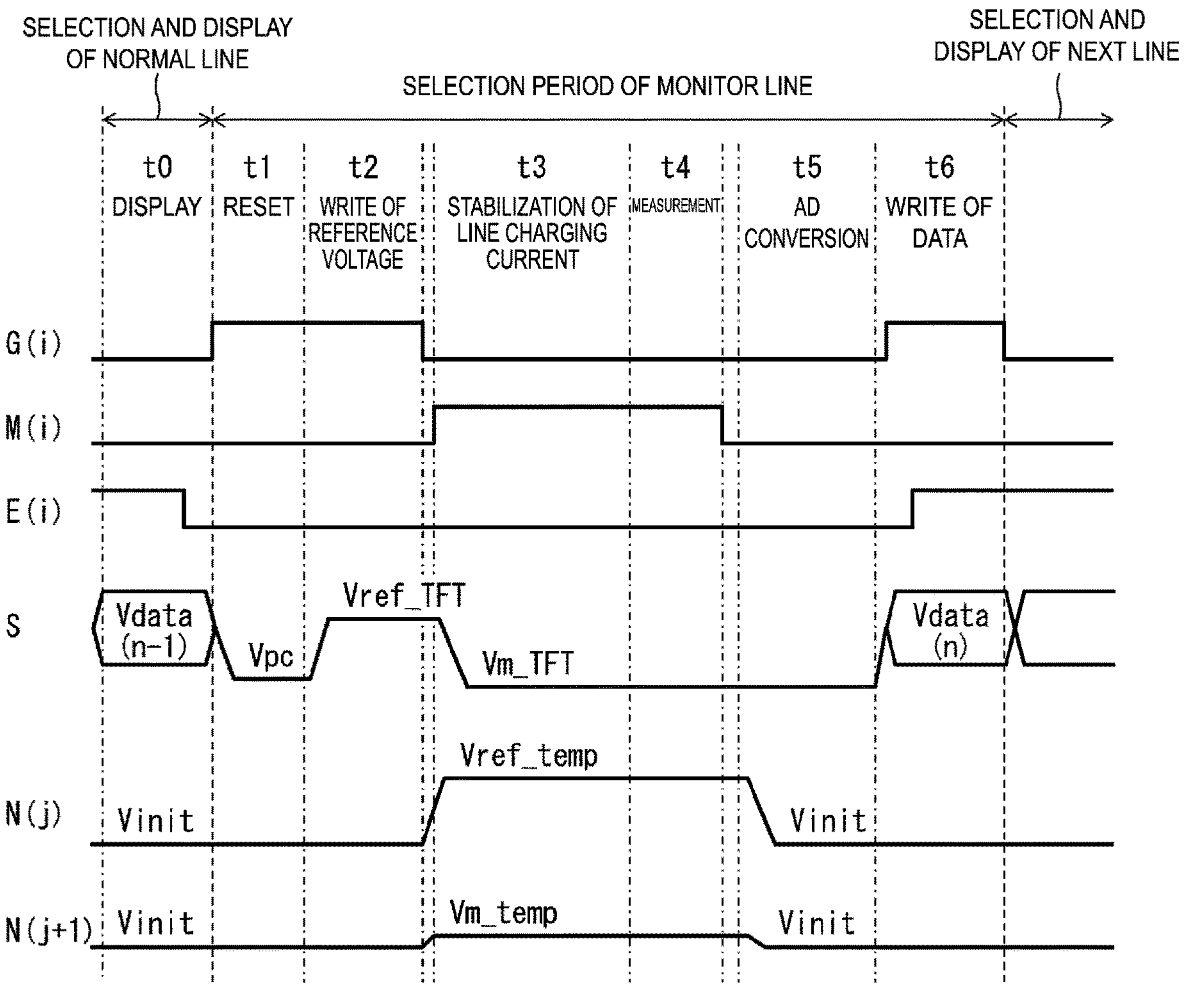
FIG. 4 is a timing chart illustrating an example of potentials of a gate line, a monitor line, an emission line, a data line, a first initialization line, and a second initialization line.

FIG. 4 is a timing chart illustrating an example of potentials of the gate line G(i), the monitor line M(i), the emission line E(i), the data line S, the first initialization line N(j), and the second initialization line N(j+1).

A display period t0 is a period of display performed immediately before display in the first pixel unit 1*a*. In the display period to, a potential of the emission line E(i) is switched from a high level to a low level, and each of a potential of the gate line G(i) and a potential of the monitor line M(i) is at a low level. In other words, in the display period t0, the first emission transistor T4*a* is switched from an on state to an off state, and each of the first write transistor T1*a*, the first monitor transistor T3*a*, the first initialization transistor T5*a*, and the first switch transistor T7*a* is in an off state. In the display period t0, a potential of the data line S is at a potential Vdata(n−1). The potential Vdata(n−1) is a potential corresponding to the fact that a data signal for display is supplied to the data line S corresponding to a pixel or a pixel unit where display is performed in the display period t0. In the display period to, each of a potential of the first initialization line N(j) and a potential of the second initialization line N(j+1) is set to a potential Vinit, which is an initialization potential, by the corresponding output circuits 330, and at this time, a gate potential of the first temperature detection transistor T6*a* is set to an inactive potential. An active potential and the inactive potential of the gate potential of the first temperature detection transistor T6*a* are respectively a potential in a state in which the gate potential of the first temperature detection transistor T6*a* is a high potential for temperature detection, and a potential in a state in which the gate potential of the first temperature detection transistor T6*a* is not the high potential, and are slightly different from a simple concept of an on/off operation in a switching element.

Subsequently, in a reset period t1, the potential of the gate line G(i) becomes a high level. In other words, in the reset period t1, the first write transistor T1*a* and the first initialization transistor T5*a* are turned on. In the reset period t1, the potential of the data line S is an initialization potential Vpc. In the reset period t1, the voltage of the initialization potential Vpc is written to the gate and the source of the first drive transistor T2*a* while charges accumulated in the source of the first drive transistor T2*a* are being initialized by turning on the first initialization transistor T5*a*.

Subsequently, in a reference voltage write period t2, the potential of the data line S rises from the initialization potential Vpc up to a potential Vref_TFT. The reference voltage write period t2 is a period in which a monitor voltage is written to the gate of the transistor to be monitored by the first monitor transistor T3*a*, that is, the gate of the first drive transistor T2*a*.

Subsequently, at the end of the reference voltage write period t2, the potential of the gate line G(i) becomes the low level. In other words, at the end of the reference voltage write period t2, the first write transistor T1*a* and the first initialization transistor T5*a* are turned off.

Subsequently, the potential of the monitor line M(i) becomes a high level during a line charging current stabilization period t3 and a measurement period t4. In other words, the first monitor transistor T3*a* and the first switch transistor T7*a* are turned on during the line charging current stabilization period t3 and the measurement period t4. In the line charging current stabilization period t3, the potential of the data line S is lowered from the potential Vref_TFT to a potential Vm_TFT. During the line charging current stabilization period t3 and the measurement period t4, the output circuit 3302 connected to the first initialization line N(j) raises the potential of the first initialization line N(j) up to the potential Vref_temp. Similarly, the potential of the second initialization line N(j+1) is changed from the potential Vinit up to a potential Vm_temp. When the potential of the first initialization line N(j) rises to the potential Vref_temp and the potential of the second initialization line N(j+1) changes to the potential Vm_temp, the gate potential of the first temperature detection transistor T6*a* becomes the potential Vref_temp and a source potential of the first temperature detection transistor T6*a* becomes the potential Vm_temp, via the first switch transistor T7*a*, and a current corresponding to the potentials flows. That is, a gate-source voltage of the first temperature detection transistor T6*a* becomes the potential Vref_temp−the potential Vm_temp, and a current corresponding to the potential Vref_temp−the potential Vm_temp flows. In the line charging current stabilization period t3, the source driver 130 itself also outputs a voltage corresponding to the potential Vm_temp to the second initialization line N(j+1). In this state, by opening the switch 9 in the measurement period t4, a current set by the first temperature detection transistor T6*a* flows through a path of the power supply line ELVDD→the first temperature detection transistor T6*a*→the first switch transistor T7*a*, and the current is monitored.

In the line charging current stabilization period t3, the first monitor transistor T3*a* is turned on by applying the monitor voltage to the data line S. Thus, in the line charging current stabilization period t3, a current flows through the first drive transistor T2*a*, the first monitor transistor T3*a*, the data line S(j), and the output circuit 3301 connected to the data line S(j) in this order.

In the line charging current stabilization period t3, the second initialization line N(j+1) is set to the monitor voltage, the gate potential of the first temperature detection transistor T6*a* is set to the active potential, and the first switch transistor T7*a* is turned on. Accordingly, in the line charging current stabilization period t3, a current flows through the first temperature detection transistor T6*a*, the first switch transistor T7*a*, the second initialization line N(j+1), and the output circuit 3302 connected to the second initialization line N(j+1) in this order.

Subsequently, at the end of the measurement period t4, the potential of the monitor line M(i) becomes the low level. In other words, at the end of the measurement period t4, the first monitor transistor T3*a* and the first switch transistor T7*a* are turned off.

Next, in an AD conversion period t5, the output circuit 3302 connected to the first initialization line N(j) decreases the potential of the first initialization line N(j) from the potential Vref_temp to the potential Vinit. Thus, no current flows through the first temperature detection transistor T6*a*. The potential of the second initialization line N(j+1) is also changed from the potential Vm_temp to the potential Vinit.

The measurement period t4 and the AD conversion period t5 are periods in which when the current flowing from the data line S to the output circuit 3301 is stabilized, the output circuit 3301 measures the current and performs AD conversion so that the current can be read out. Referring to FIG. 3 and the description thereof, characteristics of the first drive transistor T2*a* can be detected from output data from the output circuit 3301 connected to the data line S(j).

The measurement period t4 and the AD conversion period t5 are periods in which when the current flowing from the second initialization line N(j+1) to the output circuit 3302 is stabilized, the output circuit 3302 measures the current and performs AD conversion so that the current can be read out. Referring to FIG. 3 and the description thereof, characteristics of the first temperature detection transistor T6*a* can be detected from output data of the output circuit 3302 connected to the second initialization line N(j+1).

Subsequently, in a data write period t6, the potential of the gate line G(i) becomes the high level, and then, the potential of the emission line E(i) becomes the high level. In other words, in the data write period t6, the first write transistor T1*a* and the first initialization transistor T5*a* are turned on, and then, the first emission transistor T4*a* is turned on. In the data write period t6, the potential of the data line S is the potential Vdata(n). The potential Vdata(n) is a potential corresponding to the fact that a data signal for display is supplied to the data line S(j).

As described above, in the main portion 101, the characteristics of the first temperature detection transistor T6*a* can be detected together with the characteristics of the first drive transistor T2*a*.

Figure 5:
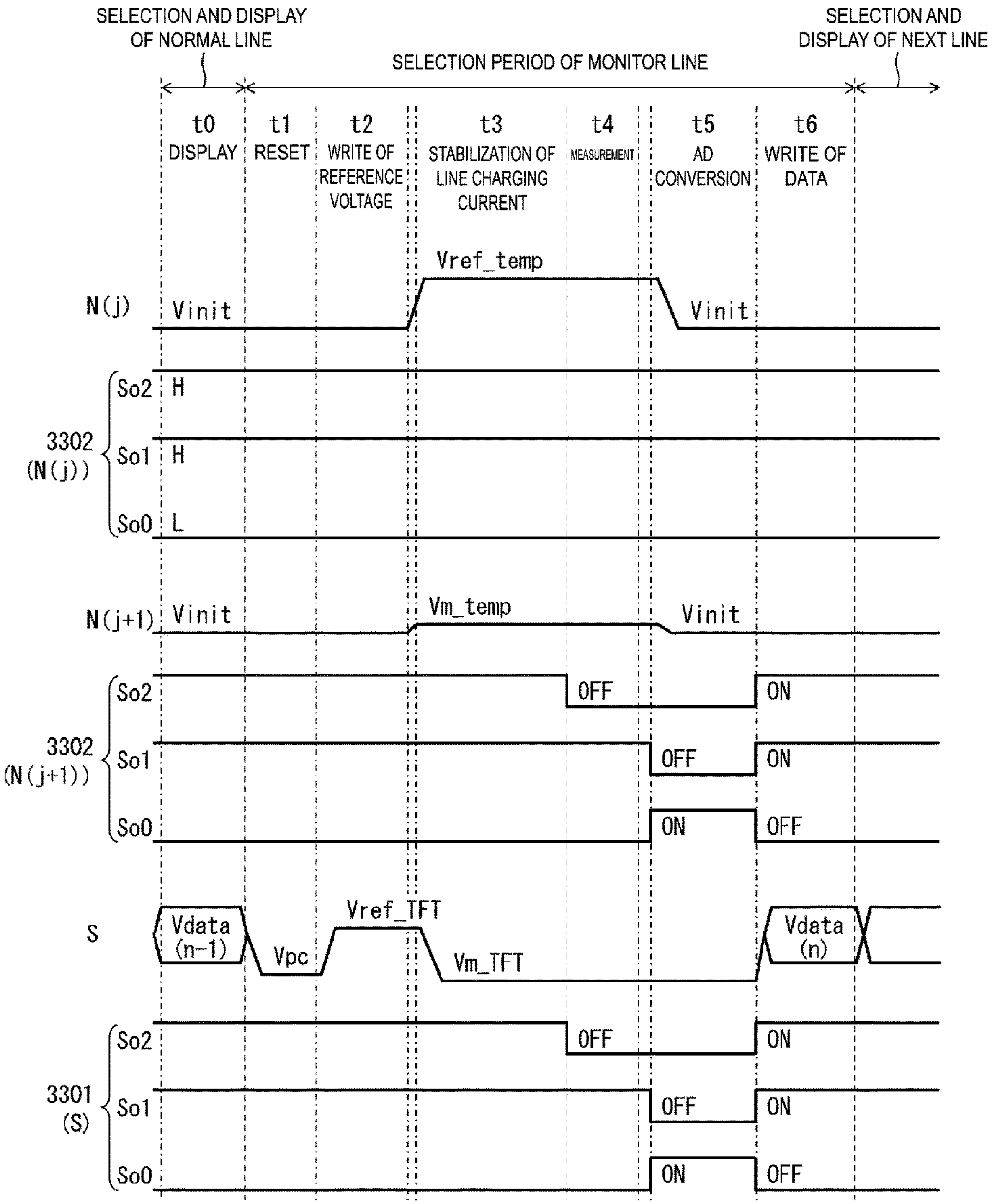
FIG. 5 is a timing chart illustrating an example of on/off states of switches of the output circuit.

FIG. 5 is a timing chart illustrating an example of on/off states of the switches 9 to 11 of the output circuit 330. The on/off states of the switches 9 to 11 correspond to high levels and low levels of the control clock signal So2, the signal So1, and the signal So0, respectively.

In the output circuit 3302 connected to the first initialization line N(j), each of the switches 9 and 10 is always in the on state and the switch 11 is always in the off state (see 3302 (N(j)) in FIG. 5).

In the output circuit 3302 connected to the second initialization line N(j+1), the switches 9 to 11 are turned on and off as follows. The switch 9 is in the off state during a period from the start of the measurement period t4 to the end of the AD conversion period t5, and is in the on state during the other periods. The switch 10 is in the off state during the AD conversion period t5, and is in the on state during the other periods. The switch 11 is in the on state during the AD conversion period t5, and is in the off state during the other periods (see 3302 (N(j+1)) in FIG. 5).

In the output circuit 3301 connected to the data line S, the switches 9 to 11 are turned on and off as follows. The switch 9 is in the off state during a period from the start of the measurement period t4 to the end of the AD conversion period t5, and is in the on state during the other periods. The switch 10 is in the off state during the AD conversion period t5, and is in the on state during the other periods. The switch 11 is in the on state during the AD conversion period t5, and is in the off state during the other periods (see 3301 (S) in FIG. 5).

Figure 6:
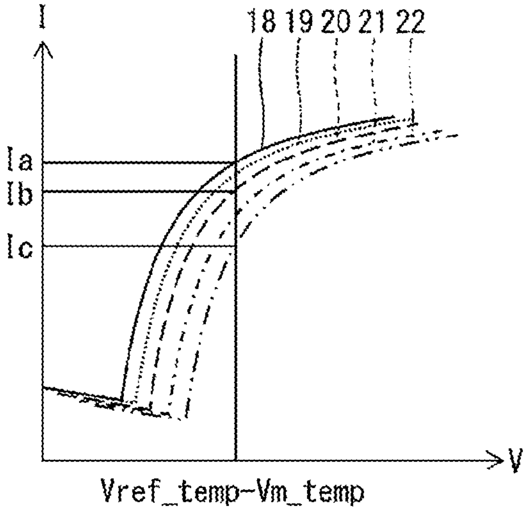
FIG. 6 is a graph for describing an example of a method for detecting a temperature of a first pixel.

FIG. 6 is a graph for describing an example of a method for detecting a temperature of the first pixel 2*a*. In FIG. 6, the horizontal axis represents a gate-source voltage of the first temperature detection transistor T6*a*, and the vertical axis represents a current flowing through the first temperature detection transistor T6*a*. According to FIG. 6, candidates 18 to 22 for characteristics of the first temperature detection transistor T6*a* are present. Differences among the candidates 18 to 22 correspond to differences in temperature of the first pixel 2*a*. The main portion 101 detects the magnitude of a current flowing through the first temperature detection transistor T6*a* when the gate-source voltage of the first temperature detection transistor T6*a* is equal to the potential Vref_temp−the potential Vm_temp. For this detection, the second initialization line N(j+1) and the output circuit 3302 connected to the second initialization line N(j+1) are used. Then, the temperature of the first pixel 2*a* can be detected by applying, to any one of the candidates 18 to 22, the magnitude of the current flowing through the first temperature detection transistor T6*a* when the gate-source voltage of the first temperature detection transistor T6*a* is the potential Vref_temp−the potential Vm_temp. For example, in a case where the magnitude of the current flowing through the first temperature detection transistor T6*a* is a current Ic when the gate-source voltage of the first temperature detection transistor T6*a* is the potential Vref_temp−the potential Vm_temp, a temperature of the first pixel 2*a* corresponding to the candidate 22 can be detected as the temperature of the first pixel 2*a*. Note that when the number of candidates for the characteristics of the first temperature detection transistor T6*a* is small, a new candidate may be created from the existing candidates by linear interpolation.

Figure 7:
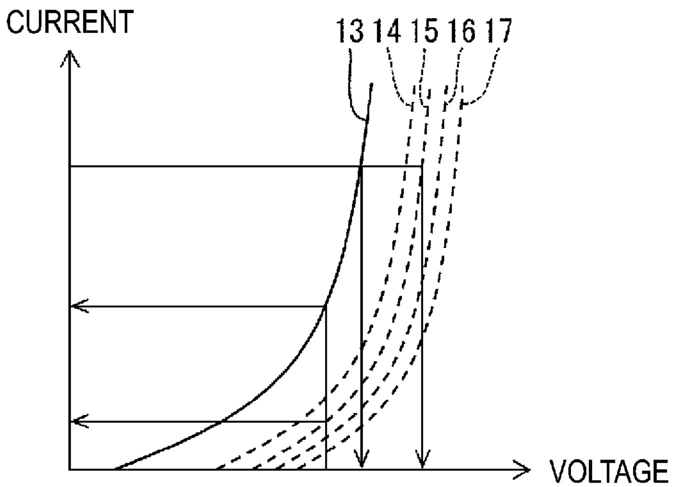
FIG. 7 is a graph for describing an example of compensation for a voltage-current characteristic shift of a first drive transistor.

FIG. 7 is a graph for describing an example of compensation for a voltage-current characteristic shift of the first drive transistor T2*a*. In FIG. 7, the horizontal axis represents a voltage, and the vertical axis represents a current.

With respect to the first pixel 2*a*, as a mechanism of external compensation, characteristics of the first drive transistor T2*a* are monitored, and a data voltage (the gate potential of the first drive transistor T2*a*) at which a target current flows is determined according to the result obtained by the monitoring. Referring to FIG. 7, current-voltage characteristics, among the characteristic candidates 13 to 17, corresponding to present deterioration in the first drive transistor T2*a* are determined from current values measured when the monitoring is performed at several monitor voltages. When the current-voltage characteristics of the first drive transistor T2*a* are determined, a current to flow through the first light-emitting element 20*a* is determined according to data necessary for display, and thus, the gate potential of the first drive transistor T2*a* is determined according to the current. Since the above is taken into consideration at a reference temperature, it is necessary to consider temperature characteristics of the first drive transistor T2*a*. In this case, a plurality of sets of current-voltage characteristic curves of the deterioration characteristics illustrated in FIG. 7 are considered to be present according to the temperatures. Thus, a set of current-voltage characteristic curves to be used is determined based on temperature information from an external temperature sensor or the like. As a result, the present deterioration characteristics of the first drive transistor T2*a* can be known, so that it is possible to determine a data voltage for causing a necessary current to flow into the first drive transistor T2*a*. Since current characteristics of the first light-emitting element 20*a* also have temperature characteristics, in reality, when the current to be caused to flow into the first light-emitting element 20*a* is determined from the data necessary for display, the current is also determined by using the temperature information. The same applies to each pixel 2 other than the first pixel 2*a*.

According to the main portion 101, the second initialization line N(j+1), which is necessary even in a display device that does not detect a temperature of the first pixel 2*a*, is used as a reading line connected to an output end of the temperature detection circuit 3*a*. Accordingly, it is not necessary to provide an unnecessary bus line in the display device in which the temperature of the first pixel 2*a* is not detected, and thus, the display device 100 with the high degree of freedom in design can be achieved.

The first switch transistor T7*a* is connected between the first temperature detection transistor T6*a* and the second initialization line N(j+1), and the gate thereof is connected to the monitor line M(i). By providing the first switch transistor T7*a*, conduction and non-conduction between the first temperature detection transistor T6*a* and the second initialization line N(j+1) can be controlled separately from the active potential and the inactive potential of the gate potential of the first temperature detection transistor T6*a* itself. This is suitable for selecting the pixel 2 that is a target for temperature detection from the pixel units 1 in one column. The first initialization line N(j) is generally common to all the pixel units 1 included in the same column as that of the first pixel unit 1*a*. Thus, when the first initialization line N(j) sets the gate potential of the first temperature detection transistor T6*a* to the active potential, the gate potentials of the temperature detection transistors corresponding to all the pixel units 1 included in the same column as that of the first pixel unit 1*a* are unintentionally set to the active potential. In this case, turning on the first switch transistor T7*a* and turning off the other switch transistors allow only the first temperature detection transistor T6*a* to be selectively brought into conduction with the second initialization line N(j+1). However, the conduction and the non-conduction between the first temperature detection transistor T6*a* and the second initialization line N(j+1) can be minimally controlled by the active potential and the inactive potential of the gate potential of the first temperature detection transistor T6*a* itself. Due to this, it is not essential that the first switch transistor T7*a* is provided in the main portion 101.

The first switch transistor T7*a* functions as a switch that switches between the conduction and the non-conduction between the first temperature detection transistor T6*a* and the second initialization line N(j+1). Because of this, the first switch transistor T7*a* may be switched on and off at a gate potential sufficiently higher than that of the first temperature detection transistor T6*a*. That is, the gate potential of the first temperature detection transistor T6*a* when the gate potential of the first temperature detection transistor T6*a* is switched from the inactive potential to the active potential may be lower than the gate potential of the first switch transistor T7*a* when the first switch transistor T7*a* is switched from the off state to the on state. This corresponds to the fact that the potential Vref_temp is lower than the potential at the high level of the potential of the monitor line M(i) in the timing chart illustrated in FIG. 4.

The period in which the gate potential of the first temperature detection transistor T6*a* is set to the active potential substantially coincides with (at least partially coincides with) the period in which the first switch transistor T7*a* is set to the on state. This corresponds to most of the line charging current stabilization period t3 and the measurement period t4 in which the potential of the monitor line M(i) is set to the high level and the potential of the first initialization line N(j) is set to the potential Vref_temp in the timing chart illustrated in FIG. 4.

The output circuit 3302 connected to the second initialization line N(j+1) has a function of a monitor circuit that performs an output that changes according to the magnitude of a current flowing through the second initialization line N(j+1).

On the other hand, the output circuit 3302 connected to the first initialization line N(j) has a function of an initialization line driver that switches between a first state and a second state. The first state is a state in which the potential of the first initialization line N(j) is the potential Vinit (a first potential) that sets the gate potential of the first temperature detection transistor T6*a* to the inactive potential. The second state is a state in which the potential of the first initialization line N(j) is the potential Vref_temp (a second potential) that sets the gate potential of the first temperature detection transistor T6*a* to the active potential.

Since the first temperature detection transistor T6*a* itself has known temperature characteristics and a flowing current thereinto changes depending on the temperature even at the same gate-source voltage, the value of the monitored current can be converted into a temperature. Since no current flows through the first temperature detection transistor T6*a* during displaying by the display device 100, deterioration of the first temperature detection transistor T6*a* can be ignored. Accordingly, the temperature of the first pixel 2*a* affected by heat generation of the display device 100 itself can be sensed, and the correction of characteristics of the first drive transistor T2*a* and the correction of various current values for display corresponding to the sensed temperature can be performed.

Second Embodiment

Figure 8:
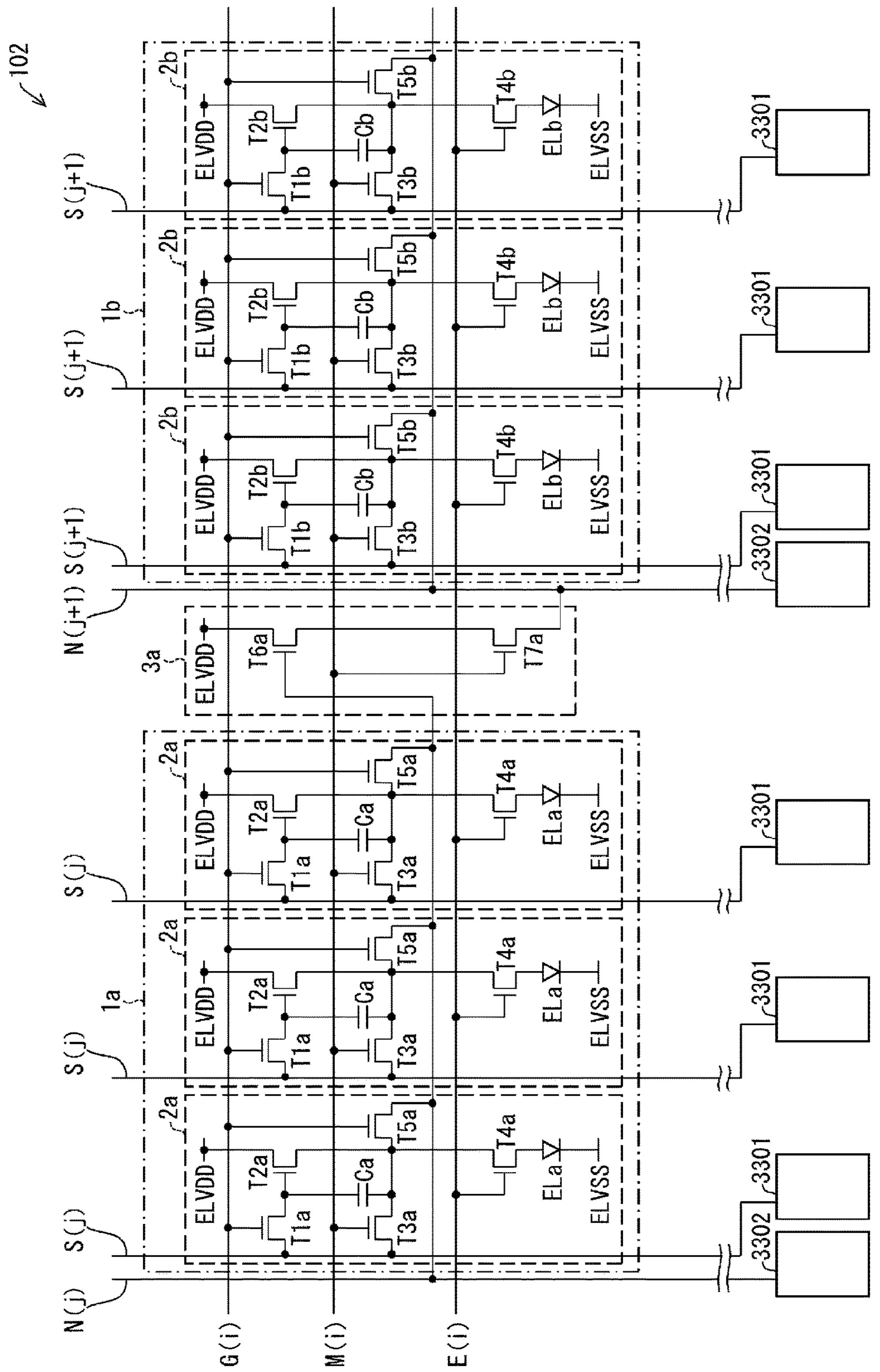
FIG. 8 is a circuit diagram illustrating a schematic configuration of a main portion of a display device according to a second embodiment of the disclosure.

FIG. 8 is a circuit diagram illustrating a schematic configuration of a main portion 102 of the display device 100 according to a second embodiment of the disclosure. The main portion 102 is illustrated with the first pixel unit 1*a*, the second pixel unit 1*b*, the first temperature detection circuit 3*a*, and the periphery thereof.

In the main portion 102, the first pixel unit 1*a* includes three first pixels 2*a*. The gate line G(i), the monitor line M(i), the emission line E(i), and the first initialization line N(j) are shared as the common wiring lines by the three first pixels 2*a*, and the data line S(j) is provided for each first pixel 2*a*. The three first pixels 2*a* correspond to, for example, a pixel that emits red light, a pixel that emits green light, and a pixel that emits blue light.

In the main portion 102, the second pixel unit 1*b* includes three second pixels 2*b*. The gate line G(i), the monitor line M(i), the emission line E(i), and the second initialization line N(j+1) are shared as the common wiring lines by the three second pixels 2*b*, and the data line S(j+1) is provided for each second pixel 2*b*. The three second pixels 2*b* correspond to, for example, a pixel that emits red light, a pixel that emits green light, and a pixel that emits blue light.

As described above, each of the numbers of the first pixels 2*a* and the second pixels 2*b* is not limited to one, and may be two or more.

Third Embodiment

Figure 9:
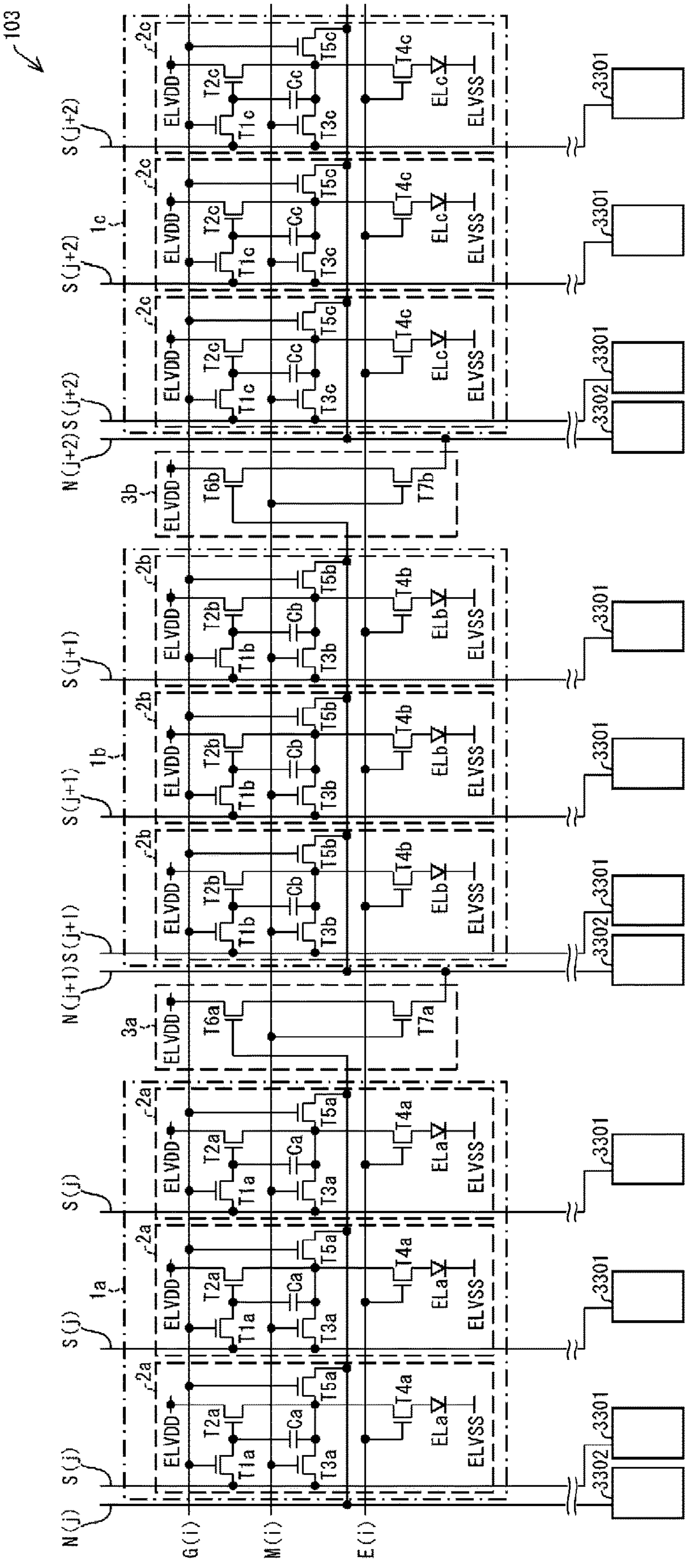
FIG. 9 is a circuit diagram illustrating a schematic configuration of a main portion of a display device according to a third embodiment of the disclosure.

FIG. 9 is a circuit diagram illustrating a schematic configuration of a main portion 103 of the display device 100 according to a third embodiment of the disclosure. The main portion 103 is illustrated with the first pixel unit 1*a*, the second pixel unit 1*b*, a third pixel unit 1*c*, the first temperature detection circuit 3*a*, a second temperature detection circuit 3*b*, and the periphery thereof. The third pixel unit 1*c* is one of the large number of pixel units 1. The second temperature detection circuit 3*b* is one temperature detection circuit 3.

The main portion 103 includes the third pixel unit 1*c* and the second temperature detection circuit 3*b* in addition to the configuration of the main portion 102.

The third pixel unit 1*c* includes at least one (here, three) third pixels 2*c*. It is assumed that the third pixel unit 1*c* is the pixel unit 1 disposed at the i-th row and the (j+2)-th column among the large number of pixel units 1 disposed in a matrix. The third pixel 2*c* includes a third write transistor T1*c*, a third drive transistor T2*c*, a third monitor transistor T3*c*, a third emission transistor T4*c*, a third initialization transistor T5*c*, a third capacitor Cc, and a third light-emitting element ELc. Each of the transistors included in the third pixel 2*c* is, for example, an n-channel type MOSFET.

A gate of the third write transistor T1*c* and a gate of the third initialization transistor T5*c* are connected to the gate line G(i) corresponding to the third pixel unit 1*c*. The third write transistor T1*c* is connected between the data line S(j+2) in the (j+2)-th column corresponding to the third pixel unit 1*c* and a gate of the third drive transistor T2*c*. The third initialization transistor T5*c* is connected between the third drive transistor T2*c* and a third initialization line N(j+2) corresponding to the third pixel unit 1*c*. The third initialization line N(j+2) is also the initialization line N in the (j+2)-th column. When the third initialization transistor T5*c* itself is turned on, the third initialization transistor T5*c* connects a source of the third drive transistor T2*c* to the third initialization line N(j+2), so that a source potential of the third drive transistor T2*c* becomes a potential of the third initialization line N(j+2) (the third drive transistor is initialized).

A gate of the third drive transistor T2*c* is connected to the data line S(j+2) via the third write transistor T1*c*. The third drive transistor T2*c* is connected between the power supply line ELVDD and the third emission transistor T4*c*.

A gate of the third monitor transistor T3*c* is connected to the monitor line M(i) corresponding to the third pixel unit 1*c*. The third monitor transistor T3*c* is connected between the data line S(j+2) and the third drive transistor T2*c*.

A gate of the third emission transistor T4*c* is connected to the emission line E(i) corresponding to the third pixel unit 1*c*. The third emission transistor T4*c* is connected between the third drive transistor T2*c* and an anode of the third light-emitting element ELc.

The anode of the third light-emitting element ELc is connected to the third emission transistor T4*c*. A cathode of the third light-emitting element ELc is connected to the power supply line ELVSS. One end of the third capacitor Cc is connected between the third write transistor T1*c* and the gate of the third drive transistor T2*c*. The other end of the third capacitor Cc is connected between the third drive transistor T2*c* and the third monitor transistor T3*c*.

The second temperature detection circuit 3*b* includes a second temperature detection transistor T6*b* and a second switch transistor T7*b*. A gate of the second temperature detection transistor T6*b* is connected to the second initialization line N(j+1). The second temperature detection transistor T6*b* is connected between the power supply line ELVDD and the third initialization line N(j+2). A gate of the second switch transistor T7*b* is connected to the monitor line M(i) corresponding to the second pixel unit 1*b*. The second switch transistor T7*b* is connected between the second temperature detection transistor T6*b* and the third initialization line N(j+2). In other words, the second temperature detection transistor T6*b* is connected to the third initialization line N(j+2) via the second switch transistor T7*b*.

The output circuit 3301 is connected to the data line S(j+2), and the output circuit 3302 is connected to the third initialization line N(j+2).

In the main portion 103, relationships among the first pixel unit 1*a*, the second pixel unit 1*b*, the first temperature detection circuit 3*a*, and the periphery thereof are similar to relationships among the second pixel unit 1*b*, the third pixel unit 1*c*, the second temperature detection circuit 3*b*, and the periphery thereof. Thus, in the main portion 103, a temperature of the second pixel 2*b* can be detected by using the second temperature detection circuit 3*b* in a manner similar to that of detecting a temperature of the first pixel 2*a* by using the first temperature detection circuit 3*a*.

That is, the display device 100 may include at least one third pixel 2*c* including the third drive transistor T2*c* and the third initialization transistor T5*c* that initializes the third drive transistor T2*c*, the third initialization line N(j+2) connected to the third drive transistor T2*c* via the third initialization transistor T5*c*, and the second temperature detection transistor T6*b* connected to the third initialization line N(j+2), the second temperature detection transistor T6*b* including a gate connected to the second initialization line N(j+1). Thus, although measurement is required twice, there is an advantage that a temperature distribution can be seen in detail.

Supplement

A display device according to a first aspect of the disclosure includes at least one first pixel including a first drive transistor and a first initialization transistor configured to initialize the first drive transistor, at least one second pixel including a second drive transistor and a second initialization transistor configured to initialize the second drive transistor, a first initialization line connected to the first drive transistor via the first initialization transistor, a second initialization line connected to the second drive transistor via the second initialization transistor, and a first temperature detection transistor connected to the second initialization line, the first temperature detection transistor including a gate connected to the first initialization line.

In a display device according to a second aspect of the disclosure, in the first aspect, the first pixel includes a monitor transistor connected to the first drive transistor, and the display device includes a monitor line connected to a gate of the monitor transistor, and a switch transistor connected between the first temperature detection transistor and the second initialization line, the switch transistor including a gate connected to the monitor line.

In a display device according to a third aspect of the disclosure, in the second aspect, a gate potential of the first temperature detection transistor at which the gate potential of the first temperature detection transistor is switched from an inactive potential to an active potential is lower than a gate potential of the switch transistor at which the switch transistor is switched from an off state to an on state.

In a display device according to a fourth aspect of the disclosure, in the second or third aspect, at least a part of a period in which a gate potential of the first temperature detection transistor is an active potential coincides with at least a part of a period in which the switch transistor is in an on state.

A display device according to a fifth aspect of the disclosure further includes, in any one of the first to fourth aspects, a monitor circuit connected to the second initialization line, the monitor circuit being configured to perform an output that changes according to a magnitude of a current flowing through the second initialization line.

In a display device according to a sixth aspect of the disclosure, in the fifth aspect, the monitor circuit performs the output when a write transistor included in the first pixel is in an off state.

A display device according to a seventh aspect of the disclosure further includes, in any one of the first to sixth aspects, an initialization line driver configured to switch between a first state in which a potential of the first initialization line is a first potential at which a gate potential of the first temperature detection transistor is set to an inactive potential and a second state in which the potential of the first initialization line is a second potential at which the gate potential of the first temperature detection transistor is set to an active potential.

In a display device according to an eighth aspect of the disclosure, in the seventh aspect, the initialization line driver is connected to the first initialization transistor and the gate of the first temperature detection transistor.

In a display device according to a ninth aspect of the disclosure, in the seventh or eighth aspect, the first potential is a potential configured to initialize the first drive transistor.

In a display device according to a tenth aspect of the disclosure, in any one of the seventh to ninth aspects, the initialization line driver does not perform an output that changes according to a magnitude of a current flowing through the first initialization line.

A display device according to an eleventh aspect of the disclosure further includes, in any one of the first to tenth aspects, at least one third pixel including a third drive transistor and a third initialization transistor configured to initialize the third drive transistor, a third initialization line connected to the third drive transistor via the third initialization transistor, and a second temperature detection transistor connected to the third initialization line, the second temperature detection transistor including a gate connected to the second initialization line.

The disclosure is not limited to each of the embodiments described above, and various modifications may be made within the scope of the claims. Embodiments obtained by appropriately combining technical approaches disclosed in each of the different embodiments also fall within the technical scope of the disclosure. Furthermore, novel technical features can be formed by combining the technical approaches disclosed in each of the embodiments.

The invention claimed is:

1. A display device comprising:
at least one first pixel including a first drive transistor and a first initialization transistor configured to initialize the first drive transistor;
at least one second pixel including a second drive transistor and a second initialization transistor configured to initialize the second drive transistor;
a first initialization line connected to the first drive transistor via the first initialization transistor;
a second initialization line connected to the second drive transistor via the second initialization transistor; and
a first temperature detection transistor connected to the second initialization line, the first temperature detection transistor including a gate connected to the first initialization line,
wherein the at least one first pixel further includes a monitor transistor connected to the first drive transistor, and
the display device further includes:
a monitor line connected to a gate of the monitor transistor; and
a switch transistor connected between the first temperature detection transistor and the second initialization line, the switch transistor including a gate connected to the monitor line.

2. The display device according to claim 1,
wherein a gate potential of the first temperature detection transistor at which the gate potential of the first temperature detection transistor is switched from an inactive potential to an active potential is lower than a gate potential of the switch transistor at which the switch transistor is switched from an off state to an on state.

3. The display device according to claim 1,
wherein at least a part of a period in which a gate potential of the first temperature detection transistor is an active potential coincides with at least a part of a period in which the switch transistor is in an on state.

4. The display device according to claim 1, further comprising:
a monitor circuit connected to the second initialization line, the monitor circuit being configured to perform an output that changes according to a magnitude of a current flowing through the second initialization line.

5. The display device according to claim 4,
wherein the monitor circuit performs the output when a write transistor included in the at least one first pixel is in an off state.

6. The display device according to claim 1, further comprising:
at least one third pixel including a third drive transistor and a third initialization transistor configured to initialize the third drive transistor;
a third initialization line connected to the third drive transistor via the third initialization transistor; and
a second temperature detection transistor connected to the third initialization line, the second temperature detection transistor including a gate connected to the second initialization line.

7. A display device comprising:
at least one first pixel including a first drive transistor and a first initialization transistor configured to initialize the first drive transistor;
at least one second pixel including a second drive transistor and a second initialization transistor configured to initialize the second drive transistor;
a first initialization line connected to the first drive transistor via the first initialization transistor;
a second initialization line connected to the second drive transistor via the second initialization transistor;
a first temperature detection transistor connected to the second initialization line, the first temperature detection transistor including a gate connected to the first initialization line; and
an initialization line driver configured to switch between a first state in which a potential of the first initialization line is a first potential at which a gate potential of the first temperature detection transistor is set to an inactive potential and a second state in which the potential of the first initialization line is a second potential at which the gate potential of the first temperature detection transistor is set to an active potential.

8. The display device according to claim 7, wherein the initialization line driver is connected to the first initialization transistor and the gate of the first temperature detection transistor.

9. The display device according to claim 7, wherein the first potential is a potential configured to initialize the first drive transistor.

10. The display device according to claim 7, wherein the initialization line driver does not perform an output that changes according to a magnitude of a current flowing through the first initialization line.

* * * * *